B. L. WORTHEN.
FURNACE.
APPLICATION FILED MAY 31, 1905.

977,249.

Patented Nov. 29, 1910.
2 SHEETS—SHEET 1.

WITNESSES:
Edward Thorpe
Walton Harrison

INVENTOR
Burt L. Worthen
BY
ATTORNEYS

B. L. WORTHEN.
FURNACE.
APPLICATION FILED MAY 31, 1905.

977,249.

Patented Nov. 29, 1910.

2 SHEETS—SHEET 2.

WITNESSES:
Edward Thorpe
Walton Harrison

INVENTOR
Burt L. Worthen
BY
[signature]
ATTORNEYS

UNITED STATES PATENT OFFICE.

BURT L. WORTHEN, OF TUCSON, ARIZONA TERRITORY, ASSIGNOR OF ONE-HALF TO MERRILL P. FREEMAN, OF TUCSON, ARIZONA TERRITORY.

FURNACE.

977,249.  Specification of Letters Patent.  Patented Nov. 29, 1910.

Application filed May 31, 1905. Serial No. 263,052.

*To all whom it may concern:*

Be it known that I, BURT L. WORTHEN, a citizen of the United States, and a resident of Tucson, in the county of Pima and Territory of Arizona, have invented a new and Improved Furnace, of which the following is a full, clear, and exact description.

My invention relates to furnaces, my more particular object being to improve the construction of furnaces and to facilitate the removal and replacement of twyers employed thereupon.

My invention further relates to certain mechanism for compensating the expansion and contraction due to varying degrees of heat.

My invention still further relates to certain specific improvements in the details of the furnace.

Reference is to be had to the accompanying drawings forming a part of this specification, in which similar characters of reference indicate corresponding parts in all the figures.

Figure 1:
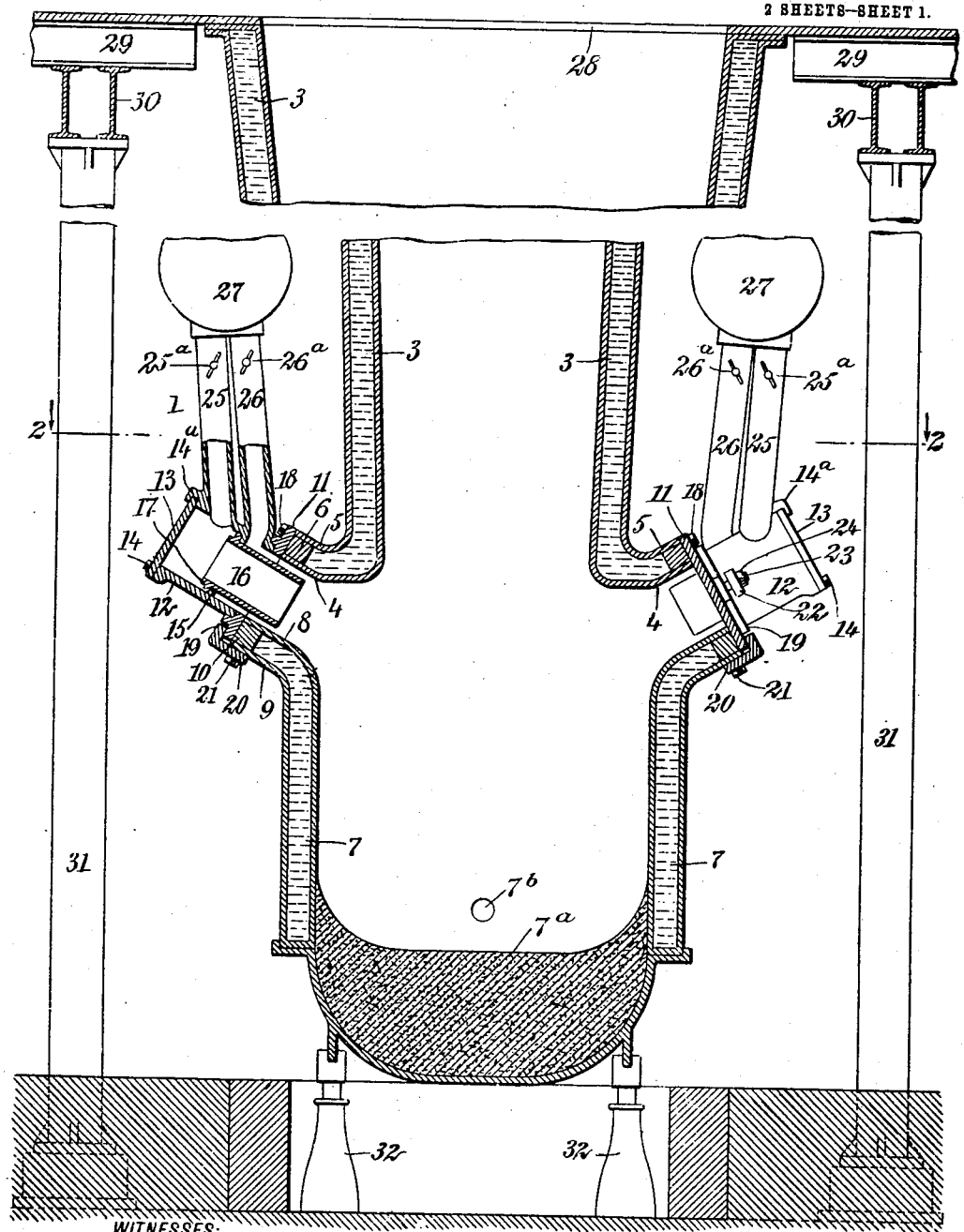
Figure 2:
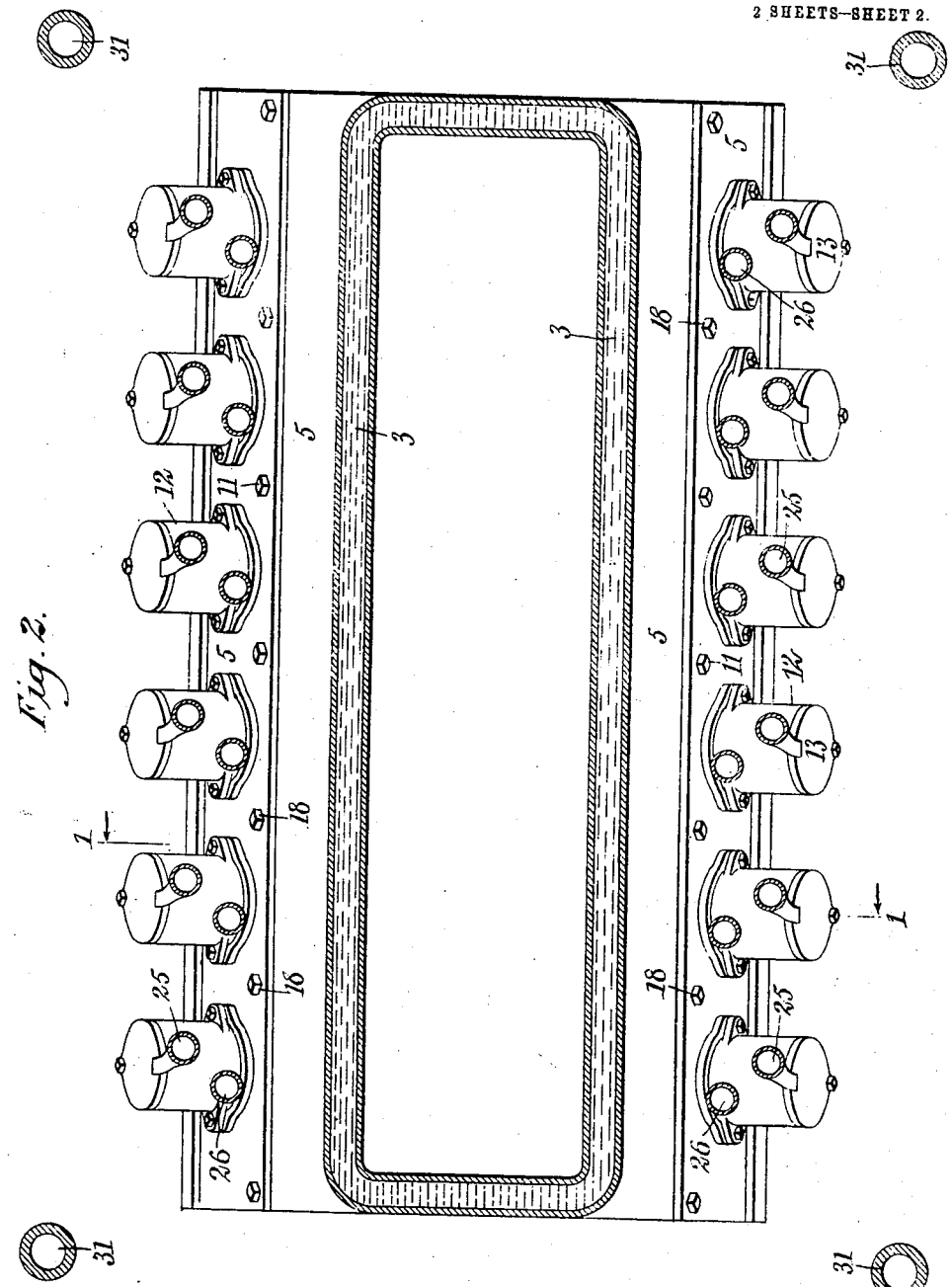

Figure 1 is a fragmentary vertical cross section showing a furnace equipped with my invention; and Fig. 2 is a section upon the line 2—2 of Fig. 1, looking in the direction of the arrow and showing certain parts in plan view.

Water jackets are shown at 3 and are provided with walls 4, 5 turned outwardly and upwardly at their lower extremities and separated by partitions 6 of metal. Below these water jackets are other jackets 7 provided with walls 8, 9 similarly separated by partitions 10, also of metal. A fireproof lining 7ª is provided. The tap hole is shown at 7ᵇ. A joining plate 11 is mounted at an oblique angle upon the water jackets 3 and 7. This joining plate supports a number of twyer cylinders 12 each provided with a cap 13 secured by means of a bolt 14. Each cap engages a lug 14ª and is free to expand and to contract within the same to a limited extent in order to allow of expansion and contraction due to varying degrees of heat. Each twyer cylinder 12 is provided internally with an annular bead 15, and extending through this annular bead is a sleeve 16 provided internally with an annular bead 17, this annular bead normally resting against the bead 15 as indicated at the left of Fig. 1. The joining plate 11 is connected by bolts 18 with the upper water jacket, and is provided with annular flanges 19 which encircle the respective tubular cylinders 12. Brackets 20 are mounted upon the lower water jacket and hook slightly over the lower edge of the joining plate. By this means the joining plate with all parts mounted thereupon is free to expand and contract under the influence of varying degrees of heat without interfering with the action of the furnace or admitting any substantial quantity of air into the same. The twyer cylinders 12 are provided with ears 22 integral therewith, and through these ears pass bolts 23 which are engaged by nuts 24 as indicated at the right of Fig. 1. By removing the nuts 24 the tubular cylinders 12 may readily be lifted out and by removing the caps 13, whether the tubular cylinders 12 be mounted upon the furnace or not, the sleeves 16 may be taken out. Each twyer consists of one of the twyer cylinders 12 and a twyer sleeve 16. Gates 25ª, 26ª open and close the pipes 25, 26 independently.

The upper water jacket 3 is connected rigidly with a horizontal plate 28 supported by I-beams 29, these I-beams resting upon larger I-beams 30 which are in turn supported upon posts 31. By this means practically all of the weight of the upper water jacket is suspended upon the posts 31. Jacks 32 support the weight of the lower water jacket 7 and of the parts resting thereupon and supported thereby. By the arrangement above described the upper and lower water jackets 3 and 7 are separated from each other, thus leaving large open zones, and these zones are closed by the joining plates 11. While these joining plates are detachable and may readily be removed by taking off the brackets 20 and removing the bolts 18, it is seldom necessary to remove the joining plates, for the reason that the twyer cylinders 12 are movable independently of each other and the sleeves 16 are removable independently of each other and of the castings in question.

The furnace above described admits of considerable adaptability and may be run continuously even if the twyer cylinders frequently get out of order; that is to say, if anything goes wrong with a twyer cylinder that particular cylinder may be removed and readily replaced without materially interfering with the general operation of the furnace. Similarly, any twyer sleeve 16 may be removed independently of the twyer cylinder 12 containing it.

The twyer pipe 26 supplies cool air around the sleeves 16 and the pipe 25 supplies air to the furnace proper. Substantially the same construction of twyer construction may be employed for burning gases.

My invention deals not so much with the use to which the twyers are applied as to the general construction whereby these parts are readily rendered removable and whereby the other results above described are attained.

The water jackets are entirely independent of each other, so that either of them may be repaired or removed without disturbing the other.

By means of the construction above described the several twyers act in unison upon the body of ore or charge in much the same manner that a single twyer would act, yet the individuality of each twyer is maintained as above described, for purposes of removal, replacement and repair. While attaining these desirable results the construction also permits the introduction, into a charge of ore, of large quantities of air and combustible gases.

It will be noted from the above description that there are a number of twyers projecting into a continuous longitudinal opening, the twyers retaining their individuality to a certain extent, but in a measure merging their effects and acting, to some extent, as a single twyer of large size. This obviates the tendency of the separate twyers to localize their heat. It also in operation gives a more general distribution of the air to the partially melted charge, as the latter passes downwardly and into the molten mass in the lower portion of the furnace. It may be noted that in the operation of a coke furnace there is often a localization to the effects of the air passing into the furnace, for the reason that the individual twyers become surrounded in places by cold particles of material that have been partially smelted above the twyers. In passing downwardly these particles, partially smelted, come into contact with the cold air blast and are thus chilled. They thereupon form bunches surrounding the twyers. Intermingled in the peculiar relations thus formed are particles of partially consumed coke which, with the accumulations referred to are often forced downwardly and past the air zone. They enter the molten mass at points below the twyers, thereby causing a flow in the coke fuel. Of course, the coke having once gone by the twyers, is unable to burn, for the reason that no more oxygen is supplied to it.

The furnace above described may be used with either gaseous or carbonaceous fuels, as the case may be, and offers decided advantages over furnaces provided with gaseous ducts or with individual twyers.

When the furnace is used with solid fuel, such as coke, a considerable economy is effected. Ordinarily in burning coke in furnaces the loss of fuel is great in proportion to the heat units generated in contact with the ores, for the reason that the distribution of the air is not properly proportioned relatively to the burning surfaces. By my construction this is remedied.

Referring again to Fig. 1, it will be noted that the upper water jackets constitute a sort of contracted throat immediately above the twyer zone and that the metal well immediately below is comparatively wide. This enables the solid fuel, when fed downwardly by degrees, to spread out a little so as to compensate for the increased cross diameter of the metal well as compared with that of the contracted throat. Hence, upon each side of the furnace the several twyers are separated from each other by open spaces and the air and gases can travel laterally along the surface of the burning fuel. In this way the combustion is rendered much more thorough. In other words, the charge of ore and coke or fuel when crowded into the narrow throat between the upper face presents a comparatively compact form, and coming into contact with the air sets up a more perfect smelting zone, and the air passing along the open rectangular space necessarily comes into contact with the fuel over a comparatively large area, such as is not supplied by pipes in the ordinary form. As portions of partially melted ore and unconsumed coke pass downwardly through the contracted throat of the upper jackets they become loosened upon entering the wider space below, and upon being thus released from restraint they spread out naturally and loosely at the exact point where the combustion is most needed. The enlargement of the lower part of the furnace and the scattering or opening up of the charge as it passes downwardly in front of the rectangular air space enable large quantities of air to be brought into contact with the sulfid ores, the result being that in burning off these ores the waste sulfur is utilized for producing heat. This gives higher concentration and effects an additional saving of fuel.

I find that with a furnace arranged as here described the liability of scaffolding or clinkering is also avoided, the reason being that the air distributes evenly at points immediately below the contracted throat. Hence, the air in entering the charge does not assume the shape of jets or definite streams, as in the ordinary type of furnace but is allowed to find its way through the adjacent points of the charge.

Having thus described my invention, I claim as new and desire to secure by Letters Patent:—

1. The combination of upper and lower water jackets supported independently of each other, a joining plate mounted upon said upper jacket and depending loosely so as to engage said lower jacket, and a bracket mounted upon said lower jacket and provided with a portion hooking over said joining plate.

2. In a furnace, the combination of upper and lower water jackets, a joining plate supported upon said upper water jacket and depending obliquely upon said lower water jacket, said joining plate being provided with a plurality of separate openings spaced apart, and a plurality of twyers reaching directly through said joining plate and extending obliquely downward therefrom.

3. In a furnace, the combination of an upper portion provided with a water jacket, and also with a throat, a lower portion of greater diameter than said upper portion, plates connected with said upper portion and inclined obliquely so as to engage said lower portion, and twyers detachably connected with said plates.

4. In a furnace, the combination of an upper portion provided at its lower end with a throat, a lower portion of greater diameter than said throat, said upper portion and said lower portion being separated by a continuous space, and a plurality of individual twyers extending into said space for the purpose of partially merging the effects of said twyers.

5. In a furnace, the combination of an upper portion provided with a throat, a lower portion having an opening of greater diameter than said throat, means for supporting said upper portion independently of said lower portion, plates connected with said upper portion and depending into engagement with said lower portion, the space adjacent to said plate and intermediate said upper portion and said lower portion being continuous, and a plurality of twyers mounted upon said plate and extending therethrough into said space.

6. In a furnace, the combination of an upper portion provided at its lower end with a throat of comparatively small diameter, a lower portion of greater diameter than said throat, plates connected with said upper portion and depending obliquely downward into engagement with said lower portion, the space intermediate said upper portion, and said lower portion, and immediately adjacent to said plates, being continuous, and a number of twyers mounted upon said plates and projecting obliquely downward through the latter into said space.

In testimony whereof I have signed my name to this specification in the presence of two subscribing witnesses.

BURT L. WORTHEN.

Witnesses:
WALTON HARRISON,
EVERARD BOLTON MARSHALL.